United States Patent [19]
Getts

[11] 3,740,807
[45] June 26, 1973

[54] INSERTED BLADE CUTTING TOOL WITH LOCKING PIN

[75] Inventor: Sidney Arthur Getts, Lake Mills, Wis.

[73] Assignee: Metal Cutting Tools, Inc., Rockford, Ill.

[22] Filed: May 25, 1972

[21] Appl. No.: 229,429

Related U.S. Application Data

[63] Continuation-in-part of Ser. No. 185,189, Sept. 30, 1971, abandoned.

[52] U.S. Cl. .............................................. 29/96 R
[51] Int. Cl. ........................................... B26d 1/00
[58] Field of Search ................. 29/95, 96, 97, 105

[56] References Cited
UNITED STATES PATENTS

| | | | |
|---|---|---|---|
| 3,137,059 | 6/1964 | Hertel | 29/96 |
| 3,173,191 | 3/1965 | Alexander et al. | 29/96 |
| 3,284,874 | 11/1966 | Green et al. | 29/96 |
| 3,341,919 | 9/1967 | Lovendahl | 29/96 |
| 3,341,920 | 9/1967 | Kelm | 29/96 |
| 3,341,921 | 9/1967 | Weller et al. | 29/96 |
| 3,341,923 | 9/1967 | Kelm | 29/96 |
| 3,488,822 | 1/1970 | Jones | 29/96 |
| 3,491,421 | 1/1970 | Holloway | 29/96 |

Primary Examiner—Harrison L. Hinson
Attorney—Wolfe, Hubbard, Leydig, Voit & Osann, Ltd.

[57] ABSTRACT

The head of the locking pin is formed with a lower portion which cams the cutting insert edgewise against a pair of locating walls and with an upper portion which engages the insert to limit bending of the pin after the insert has been pressed against the walls, both portions of the head serving to clamp the insert to an underlying platform. A washer is captivated on the pin and retains a hardened insert-supporting shim on the pin when the latter is loosened to enable replacement or indexing of the insert.

21 Claims, 5 Drawing Figures

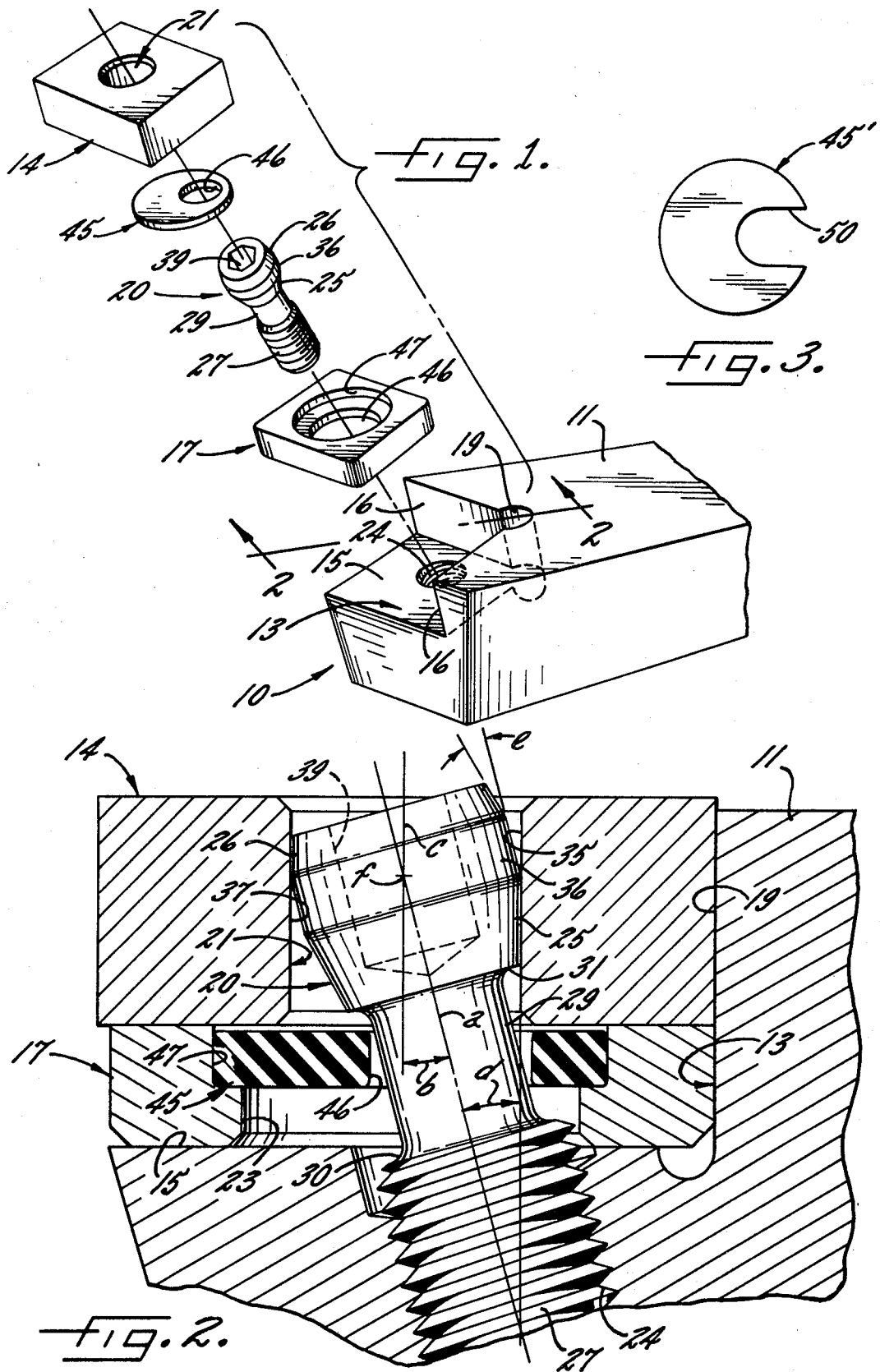

INSERTED BLADE CUTTING TOOL WITH LOCKING PIN

CROSS-REFERENCE TO A RELATED APPLICATION

This application is a continuation-in-part of my application Ser. No. 185,189, filed Sept. 30, 1971 and now abandoned.

BACKGROUND OF THE INVENTION

This invention relates to a locking pin for clamping a wafer-like cutting insert to an insert holder. More particularly, the invention constitutes an improvement over the arrangement disclosed in Lovendahl U.S. Pat. 3,341,919 in which the locking pin is threaded into an inclined hole in the holder and is formed with a head which wedges against one wall of a cylindrical opening in the insert and cams the insert edgewise against a locating abutment on the holder while clamping the insert to the holder.

SUMMARY OF THE INVENTION

When compared with prior pins of the same general type, the locking pin of the present invention effects more secure clamping of the insert to the holder and, at the same time, is less susceptible to being bent by the forces applied to the pin during final tightening of the pin after the latter has cammed the insert against the locating abutment. In large, these ends are achieved by forming the head of the pin such that a first portion of the head wedges against one wall of the insert opening and cams the insert edgewise while a second portion of the head engages the diametrically opposite wall of the insert opening. Engagement of the second portion of the head with the diametrically opposite wall of the insert opening not only backs and supports the pin against bending during final tightening of the pin but also causes the applied clamping force to be exerted at an additional contact location on the insert thereby to anchor the insert more rigidly to the holder.

A further object of the invention is to establish line contact between the head and the walls of the insert opening by forming the two portions of the head as two oppositely tapered frustums.

The invention also resides in the novel manner of captivating an insert shim on the pin when the latter is loosened to enable removal or indexing of the insert.

These and other objects and advantages of the invention will become more apparent from the following detailed description when taken in conjunction with the accompanying drawings.

BRIEF DESCRIPTION OF THE DRAWINGS

FIG. 1 is a fragmentary exploded perspective view of an exemplary cutting tool equipped with a new and improved locking pin embodying the novel features of the present invention.

FIG. 2 is a enlarged fragmentary cross-section as taken along the line 2—2 of the tool shown in FIG. 1 when the tool is assembled.

FIG. 3 is a plan view of an alternative embodiment of a washer for captivating the insert shim on the pin.

DETAILED DESCRIPTION OF THE PREFERRED EMBODIMENT

Figure 4:
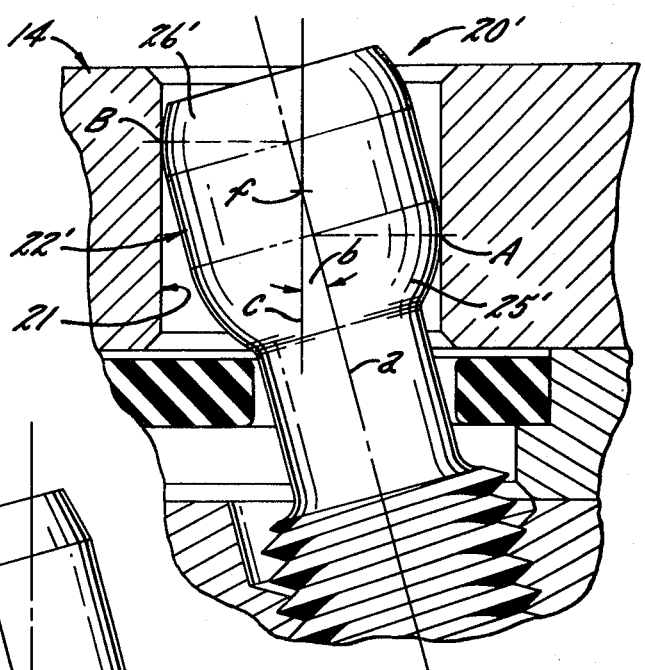
FIG. 4 is a fragmentary view similar to FIG. 2 but showing another embodiment of a locking pin incorporating the features of the invention.

As shown in the drawings, the invention is embodied in a metal cutting tool 10 which, for simplicity, has been illustrated as being a lathe tool although it will be appreciated that the principles of the invention are applicable to various other types of cutters such as boring cutters and milling cutters. The illustrated tool comprises an elongated holder 11 having one end formed with a pocket 13 for receiving a wafer-like indexable cutting insert 14 made of tungsten carbide or the like, the pocket being defined by an upwardly facing platform 15 and by two right angular locating abutments or walls 16 located at the inner end of the platform and projecting upwardly from the latter.

Preferably but not necessarily, the insert 14 rests on a replaceable shim 17 which is positioned on the platform 15 and which corresponds generally in shape to the pocket 13 while being shallower than the pocket. The shim is hardened and serves to protect the platform against wear and damage.

In this particular instance, the cutting insert 14 is generally rectangular and, when fully seated in the pocket 13, is clamped downwardly against the shim 17 and the platform 15 and is crowded edgewise and diagonally into the corner 19 (FIG. 1) defined between the two locating walls 16. The latter engage the two inner side edges of the insert and accurately locate the insert in a cutting position with its outer side edges and intervening corner overhanging the corresponding edges of the shim and the platform.

To clamp the insert 14 and the shim 17 in the pocket 13, a locking pin 20 with a head 22 is telescoped into an opening 21 in the insert, extends through a bore 23 in the shim, and is threaded into a hole 24 extnding through the holder 11. The opening 21 in the insert is generally cylindrical and is centered relative to the insert to permit indexing and/or inverting of the latter in the pocket to present a new cutting edge into cutting position when the active cutting edge becomes worn. The bore 23 in the shim is concentric with the opening 21 and is somewhat larger than the opening. As shown in FIG. 2, the threaded hole 24 in the holder is located near the inner end portion of the bore 23 and is inclined relative to the platform 15. Thus, upon progressing upwardly, the axis $a$ of the hole 24 diverges outwardly away from the corner 19 between the locating walls 16 and is inclined at an angle $b$ (herein of about 15 degrees) relative to the axis $c$ of the opening 21 through the insert. The axis $c$ is perpendicular to the platform 15 in all planes and both axes are located in a common vertical plane extending perpendicular to the platform and bisecting the right angle between the locating walls 16.

In accordance with the present invention, the upper end portion or head 22 of the locking pin 20 is formed with lower and upper sections 25 and 26 which wedge into the opening 21 in the insert 14 and coact with one another to clamp the insert at multiple locations and thereby anchor the insert and the shim 17 very tightly to the platform 15. Moreover, the lower section 25 engages one wall of the opening and cams the insert edgewise to crowd the latter into the corner 19 and against the locating walls 16 while the upper section 26 engages the diametrically opposite wall of the opening to restrict bending of the pin during final tightening of the pin after the insert has been pressed against the locating walls. Accordingly, the pin effects better clamping of the insert than prior pins of the same general character and is more durable and trouble-free in service use.

More specifically, the locking pin 20 comprises a lower threaded shank 27 (FIG. 2) which is adapted to be screwed into the hole 24 in the holder 11. Formed integrally with the upper end of the shank is an elongated neck 29 which is somewhat smaller in diameter than the shank, a rounded fillet 30 being formed at the junction of the neck with the shank to reduce the concentration of stress at the junction. A similar fillet 31 is located at the upper end of the neck 29 and defines the junction between the neck and the lower section 25 which preferably is shaped as a frustum. As shown in FIG. 2, the lower frustum 25 tapers downwardly toward the neck 29 at a cone angle $d$ which herein is equal to the angle $b$ between the axes $a$ and $c$ of the hole 24 and the opening 21 so as to make the inner side of the frustum 25 parallel the inner wall 35 of the opening 21 when the locking pin 20 is threaded into the hole 24.

The major diameter of the upper end of the lower frustum 25 is somewhat less than the diameter of the opening 21 and is equal to the diameter of a cylindrical section 36 (FIG. 2) formed on the upper end portion of the pin between the lower frustum 25 and the upper section 26 which also is shaped as a frustum. The upper frustum 26 is formed with a major diameter equal to the diameter of the cylindrical section 36 and tapers upwardly away from the cylindrical section at a cone angle $e$ which also is equal to the angle $b$ between the axes $a$ and $c$. As a result, the outer side of the upper frustum 26 parallels the outer wall 37 of the opening 21 when the pin 20 is threaded into the hole 24. To enable threading of the pin, an upwardly opening socket 39 is formed in the upper end portion of the pin and is adapted to receive a suitable torque-transmitting tool such as an Allen wrench. A similar socket (not shown) opens out of the lower end of the shank 27 to enable turning of the pin from the lower side of the holder 11 if desired or if the upper socket 39 should happen to be damaged after extended use.

To install and lock the insert 14, the shim 17 is placed on the platform 15 and the pin 20 is threaded into the hole 24 in the holder 11. Initially, the pin is just started into the hole and thus the cylindrical section 36 remains well above the shim and well outwardly of the locating walls 16. In this position of the pin, the radial distance between the locating walls 16 and the adjacent sides of the cylindrical section 36 is less than the radial distance between the inner edges of the insert 14 and the adjacent walls of the opening 21. Accordingly, the insert may be slipped over the upper end portion of the pin and placed on the shim.

Thereafter, the pin 20 is tightened into the hole 24 to draw the upper end portion of the pin downwardly into the opening 21. As an incident thereto, the inner side of the lower frustum 25 engages and wedges against the inner wall 35 of the opening 21 and cams the insert 14 edgewise and diagonally toward the corner 19 between the two locating walls 16 while forcing the insert downwardly. In other words, the radial distance between the lower frustum 25 and the locating walls 16 decreases as the pin 20 is tightened and, because of the inclination of the hole 24 and the inclination of the frustum, a force with horizontal and vertical components is exerted on the insert. The horizontal component crowds the insert edgewise toward the corner 19 and against the locating walls 16 while the vertical component acts on the triangular section of the insert located inwardly of the opening 21 and serves to clamp that section downwardly against the shim 17 and to clamp the shim downwardly against the platform 15.

As the inner edges of the insert 14 are forced against and stopped by the locating walls 16 and upon continued tightening of the pin 20, the upper end portion of the pin tends to bend outwardly by virtue of the lower frustum 25 being forced against the inner wall 35 of the opening 21 of the stopped insert. Such bending, however, is resisted and limited during final tightening of the pin because the outer side of the upper frustum 26 engages the outer wall 37 of the opening 21. As a result of such engagement, the upper end portion of the pin is backed and supported by the upper frustum 26 and the outer wall 37 thereby to limit outward deflection of the pin. In addition, the outer side of the upper frustum 26 is forced against the outer wall 37 and exerts a downward force on the triangular portion of the insert located outwardly of the opening 21. That portion of the insert thus is clamped downwardly against the shim 17 by such force while the shim, in turn, is clamped downwardly against the platform 15. As a result, both the inner and outer triangular sections of the insert are clamped by the pin. In the finally clamped position of the pin, the midportion of the cylindrical section 36 is located approximately at the intersection $f$ of the axis $a$ with the axis $c$.

From the foregoing, it will be apparent that the present invention brings to the art a new and improved locking pin 20 which is capable of exerting a downward clamping force on the insert 14 at two contact locations as a result of the lower and upper frustums 25 and 26 bearing against the inner and outer walls 35 and 37, respectively, of the opening 21. More secure clamping of the insert thus is achieved. Moreover, the lower frustum is effective to cam the insert edgewise against the abutment walls 16 while the upper frustum resists bending of the pin under the forces applied to the pin when the insert is stopped by the abutment walls. Line contact between the frustums and the walls of the opening 21 is established by virtue of the correlation of the cone angles $d$ and $e$ of the frustums with the angle $b$ of inclination between the axes $a$ and $c$ and by virtue of the intermediate cylindrical section 36 which enables the insert to initially be slipped onto the pin and yet permits sizing of the frustums to a sufficiently large diameter to achieve line contact.

In order to obtain the basic advantages of the invention, it is not necessary that the upper and lower portions of the head 22 be formed as frustums as long as the head is sized and shaped such that one portion of the head engages one wall of the opening 21 while the other portion engages the diametrically opposite wall in essentially the same manner as the frustums. For example, FIG. 4 shows a locking pin 20' with a head 22' whose lower and upper portions 25' and 26' are formed with radiused or rounded surfaces rather than tapered surfaces. The inner surface of the lower portion 25' engages the inner wall of the opening 21 at a point A while the outer surface of the upper portion 26' engages the outer wall of the opening at a point B to achieve substantially the same results as produced by the frustums 25 and 26 but without obtaining the benefit of line contact between the head and the walls of the opening.

The locking pin 20' illustrated in FIG. 4 not only demonstrates that the upper and lower portions of the head need not necessarily be formed as frustums but also shows that the uppermost contact point A of the lowermost portion 25' and the lowermost contact point B of the upper portion 26' need not necessarily lie in the horizontal plane which contains the intersection point $f$ between the axes $a$ and $c$.

Figure 5:
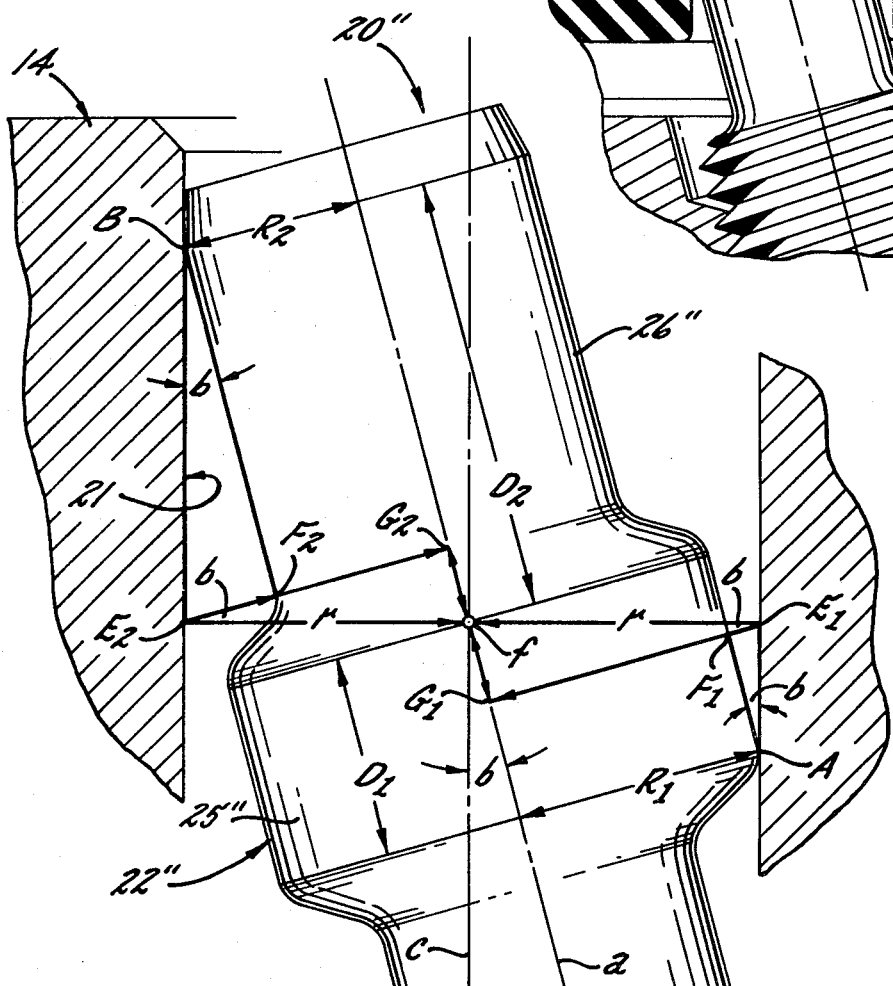
FIG. 5 also is a view similar to FIG. 2 but on an enlarged scale and showing still another embodiment of the locking pin.

Although perhaps not the best from the standpoint of sound design techniques, the locking pin 20'' shown in FIG. 5 demonstrates that the head 22'' may take rather extreme shapes and still achieve the basic advantages of the invention. In this instance, the lower portion 25'' is of significantly greater diameter than the upper portion 26'' and, like the pin 20', neither the uppermost contact point A of the lower portion 25'' nor the lowermost contact point B of the upper portion 26'' lies in the horizontal plane which contains the intersection point $f$ of the axes $a$ and $c$. Also, the contact surface of the lower portion 25'' is radiused while the contact surface of the upper portion 26'' is formed as a frustum.

Reference to the locking pin 20'' shown in FIG. 5 will facilitate an explanation of the fundamental relations by which the head may be sized and shaped while still complying with the basic principles of the invention. First, the contact point A should lie in or below a horizontal plane containing the intersection point $f$ while the contact point B should lie in or above such plane. Secondly, it is apparent that the maximum radius of the head can never be greater than the minimum radius $r$ of the opening 21 through the insert 14. Also, because the axis $a$ of the hole 24 is inclined relative to the axis $c$ of the opening 21, the maximum radius of the head must always be less than the radius $r$ of the opening in order for the pin to be inserted into the opening and threaded into the hole. The maximum dimension which any given radius of the head may take depends upon the angle $b$ of inclination of the axis $a$ relative to the axis $c$ and also upon the spacing along the axis $a$ of that particular radius from the intersection point $f$. In no case can any radius of any portion of the head within the opening 21 exceed a dimension equal to $r \cos b$ or else the pin cannot be inserted into the opening 21 and threaded into the hole 24. Finally, in order for the head to properly clamp the insert 14 and limit bending of the pin, the contact points A and B must be spaced along the axis $a$ from the point $f$ by distances not less than $r \sin b$. If the radius of the head at one of the contact points is equal to the value of $r \cos b$, then such a radius should be spaced along the axis $a$ from the point $f$ by a distance which exceeds the value $r \sin b$ by 0.001 inch or so in order to enable the pin to properly clamp the insert 14. If the radius of the head at a given contact point is made less than the value of $r \cos b$, the spacing of that radius from the point $f$ must be increased in accordance with a function to be described below.

Let it be assumed now that it is desired to make the radius of the lower portion 25'' of the head 22'' at the contact point A of a given dimension $R_1$ equal to or less than $r \cos b$ and that it is desired to make the radius of the upper portion 26'' at the contact point B of a given dimension $R_2$ which also is equal to or less than $r \cos b$. With these dimensions known, the distances $D_1$ and $D_2$ which the radii $R_1$ and $R_2$ should be spaced from the intersection point $f$ along the axis $a$ can be determined substantially from the relationships:

$$D_1 = r \sin b + (r \cos b - R_1)/\tan b \quad (1)$$

$$D_2 = r \sin b + (r \cos b - R_2)/\tan b \quad (2)$$

To explain the derivation of equation (1), reference is made to the two right triangles $E_1G_1f$ and $E_1F_1A$ of FIG. 5. Now, the distance $D_1$ may be expressed as:

$$D_1 = G_1f + F_1A \quad (3)$$

And, the distance $G_1f$ may be expressed as:

$$G_1f = E_1f \sin b \quad (4)$$

$$= r \sin b \quad (5)$$

The distance $F_1A$ may be expressed as: $F_1A = (E_1F_1)/\tan b$ (6)

And, the distance $E_1F_1$ is equal to:

$$E_1G_1 - R_1 \quad (7)$$

And, the distance $E_1G_1$ may be expressed as:

$$E_1G_1 = E_1f \cos b \quad (8)$$

$$= r \cos b \quad (9)$$

By substituting $r \cos b$ for $E_1G_1$ in expression (7), $E_1F_1$ becomes:

$$r \cos b - R_1 \quad (10)$$

And, by substituting $r \cos b - R_1$ for $E_1F_1$ in expression (6), the value of $F_1A$ becomes:

$$(r \cos b - R_1)/\tan b \quad (11)$$

Finally, the values of $G_1f$ and $F_1A$ found in expressions (5) and (11), respectively, may be substituted for the corresponding values in equation (3) to produce equation (1), that is: $D_1 = r \sin b + (r \cos b - R_1)/\tan b$ Equation (2) with regard to the distance $D_2$ may be derived by following the same process with respect to the triangles $E_2G_2f$ and $E_2F_2B$ of FIG. 5.

To summarize, effective contact between the lower portion 25'' of the head 22'' and the inner wall of the opening 21 and between the upper portion 26'' of the head and the outer wall of the opening can be effected regardless of the shape of the head by sizing the head such that:

A. the uppermost contact point A between the lower end portion 25" of the head and the inner wall of the opening is not above the intersection point $f$ and is spaced radially from the axis $a$ along a radius of dimension $R_1$ which is not greater than $r \cos b$;

B. the lowermost contact point B between the upper end portion 26" of the head 22" and the outer wall of the opening 21 is not below the intersection point $f$ and is spaced radially from the axis $a$ along a radius of dimension $R_2$ which is not greater than $r \cos b$;

C. the contact point A and the contact point B are spaced along the axis $a$ from the intersection point $f$ by distances $D_1$ and $D_2$, respectively, which are not less than $r \sin b$; and D. the distances $D_1$ and $D_2$ are related to the dimensions $R_1$ and $R_2$, respectively, substantially in accordance with equations (1) and (2).

Of course, good design techniques will dictate other factors such as the particular shape of the head, the particular location of the contact points A and B, and the size of the head at locations other than the contact points. And as pointed out above, any given radii $R_1$ and $R_2$ chosen for the contact points $A$ and $B$ should be spaced from the intersection $f$ by a few thousands of an inch greater than the values of $D_1$ and $D_2$ yielded by equations (1) and (2) so as to provide an interference fit between the head 22" and the opening 21 to insure proper clamping of the insert 14. Once the contact points have been established, the radius of that portion of the head below the contact point A should decrease as the head progresses downwardly and, by the same token, the radius of that portion of the head above the contact point B should decrease as the head progresses upwardly. If the upper and lower portions of the head are to be formed as frustums to establish line contact with the walls of the opening 21, the radii of the upper and lower portions will decrease substantially in accordance with equations (1) and (2), respectively, as the lower portion proceeds downwardly from the contact point A and the upper portion proceeds upwardly from the contact point B. Also, the spacing along the axis $a$ between any given contact point on the upper portion of the head and any given contact point on the lower portion of the head is equal to the sum of equations (1) and (2) regardless of whether the upper and lower portions are rounded or formed as frustums.

Referring once again to the embodiment of the invention shown in FIGS. 1 and 2, means are advantageously provided for captivating the shim 17 on the locking pin 20 so that the shim will be retained on the pin when the latter is loosened to enable replacement or indexing of the insert 14. Herein, these means comprise a circular washer 45 (FIGS. 1 and 2) made of neoprene or other resiliently yieldable material and formed with an eccentric opening 46. When the washer is relaxed, the diameter of the opening 45 is somewhat greater than the diameter of the neck 29 but is less than the diameter of the shank 27 and the minor diameter of the lower frustum 25. By stretching the washer, the opening 45 may be enlarged to enable the washer to be snapped over the upper end portion of the pin 20 and to be moved downwardly into encircling relation with the neck 29. When permitted to relax, the washer thus is captivated on the neck between the shank 27 and the lower frustum 25.

As shown in FIG. 2, the washer 45 is seated in a counterbore 47 in the upper end of the shim 17 and underlies the underside of the lower frustum 25 when the pin 20 is threaded into the hole 24. When the pin is loosened for purposes of replacing or indexing the insert 14, engagement of the washer with the lower frustum keeps the shim from being removed upwardly off of the upper end of the pin.

A modified washer 45' is shown in FIG. 3 and, in this instance, the washer is made of metal and is formed with a slot 50 which opens out of one edge of the washer, the width of the slot being somewhat greater than the diameter of the neck 29 but being smaller than the diameter of the shank 27 and the minor diameter of the lower frustum 25. The washer 45' is adapted to be slipped edgewise over the neck 29 prior to tightening of the pin 20 and, when the washer is subsequently seated in the counterbore 47, the edges of the slot 50 underlie the underside of the lower frustum 25 to prevent removal of the shim 17 from the upper end of the pin 20. Edgewise removal of the shim is prevented by engagement of the inner wall of the bore 23 with the upper end portion of the shank 27.

For clarity of understanding, the cutting tool 10 of the present invention has been illustrated in the drawings with the insert 14 facing upwardly and each of the locking pins has been described as having "upper" and "lower" portions. Also, in certain ones of the appended claims, the terms "upper" and "lower" and other like terms indicating direction or orientation have been used merely for the purpose of simplification. Those skilled in the art will clearly appreciate, however, that the particular cutting tool 10 which has been illustrated and other cutting tools to which the invention is applicable need not necessarily be oriented with the insert facing upwardly but, indeed, such tools can be oriented in various different manners. Accordingly, the terms in the claims indicating direction or orientation in a vertical sense should be considered only for the purpose of establishing a datum reference which is applicable when any particular tool is oriented with the opening in its insert facing generally upwardly.

I claim as my invention:

1. The combination of a wafer-like cutting insert, an insert holder and means for locking said insert to said holder, said holder having an upwardly facing platform for supporting the lower face of said insert and having an inner abutment projecting upwardly from said platform for engaging one edge of said insert to locate the latter in a cutting position, a generally cylindrical opening extending through said insert and having an axis extending substantially perpendicular to said platform, a hole formed in said holder and opening out of the upper side of said platform, said hole having an axis which diverges outwardly away from said abutment as it progresses upwardly and which is inclined at a predetermined angle relative to the axis of said opening, said locking means comprising a pin having a lower shank extending into and adapted to be tightened within said hole, and said pin having an upper head of generally circular cross-section and sized and shaped such that the lower end portion of the head engages the inner wall of said opening to crowd said insert edgewise against said abutment and clamps said insert to said platform while the upper end portion of said head engages the outer wall of said opening to limit bending of said pin and to help clamp said insert to said platform.

2. The combination of a wafer-like cutting insert, an insert holder and means for locking said insert to said holder, said holder having an upwardly facing platform for supporting the lower face of said insert and having an inner abutment projecting upwardly from said platform for engaging one edge of said insert to locate the latter in a cutting position, a generally cylindrical opening extending through said insert and having an axis $c$ extending substantially perpendicular to said platform, a hole formed in said holder and opening out of the upper side of said platform, said hole having an axis $a$ which diverges outwardly away from said abutment as it progresses upwardly and which is inclined at a predetermined acute angle $b$ relative to the axis $c$ of said opening, said locking means comprising a pin having an axis coinciding with said axis $a$ of said hole and having a lower shank extending into and adapted to be tightened within said hole, said pin including an upper head of generally circular cross-section disposed within said opening and sized and shaped such that the lower end portion of the head engages the inner wall of said opening to crowd said insert edgewise against said abutment and clamps said insert to said platform while the upper end portion of said head engages the outer wall of said opening to reduce bending of said pin and to help clamp said insert to said platform, the sizing and shaping of said head being such that:
  A. the uppermost contact point between the lower end portion of said head and the inner wall of said opening is not above the intersection point $f$ of said axes $a$ and $c$ and is spaced from said axis $a$ along a radius of dimension $R_1$,
  B. the lowermost contact point between the upper end portion of said head and the outer wall of said opening is not below the intersection point $f$ and is spaced from said axis $a$ along a radius of dimension $R_2$,
  C. the lowermost contact point and the uppermost contact point are spaced along the axis $a$ from the intersection point $f$ by distances $D_1$ and $D_2$, respectively, which are not less than:

$$r \sin b$$

where $r$ is the minimum radius of said opening,
  D. the dimensions $R_1$ and $R_2$ are not greater than:

$$r \cos b,$$ and

E. the distances $D_1$ and $D_2$ are related to the dimensions $R_1$ and $R_2$, respectively, substantially in accordance with the functions:

$$D_1 = r \sin b + (r \cos b - R_1)/\tan b$$
$$D_2 = r \sin b + (r \cos b - R_2)/\tan b$$

3. A locking pin adapted to extend through a generally cylindrical opening in a cutting insert and operable to clamp the insert to an insert holder, said pin having an axis $a$ inclined at a predetermined acute angle $b$ relative to the axis of said opening, having a threaded shank adapted to be screwed into said holder and having a head of generally circular cross-section positionable in said opening, said head being sized and shaped such that:
  A. one radius of dimension $R_1$ of said head contacts one wall of the opening at a first contact point while a second radius of dimension $R_2$ contacts a diametrically opposite wall of said opening at a second contact point spaced along said axis $a$ from said first contact point, and
  B. the spacing between said contact points along said axis $a$ is substantially equal to:

$$2r \sin b + (r \cos b - R_1)/\tan b + (r \cos b - R_2)/\tan b$$

where $r$ is the minimum radius of said opening.

4. A locking pin as defined in claim 3 in which said head is formed with rounded surfaces at said contact points.

5. A locking pin as defined in claim 3 in which said head is formed with oppositely tapered frustums.

6. The combination of a wafer-like cutting insert, an insert holder and means for locking said insert to said holder, said holder having an upwardly facing platform for supporting the lower face of said insert and having an inner abutment projecting upwardly from said platform for engaging one edge of said insert to locate the latter in a cutting position, an opening of circular cross-section extending through said insert and having an axis extending substantially perpendicular to said platform, a threaded hole formed in said holder and opening out of the upper side of said platform, said hole having an axis which diverges outwardly away from said abutment as it progresses upwardly and which is inclined at a predetermined angle relative to the axis of said opening, said locking means comprising a pin having a lower shank threaded into said hole, the upper end portion of said pin having a lower frusto-conical section which tapers downwardly and wedges against the inner wall of said opening to crowd said insert edgewise against said abutment while clamping said insert to said platform, and the upper portion of said pin having an upper frusto-conical section which tapers upwardly and wedges against the outer wall of said opening to reduce bending of the pin at the junction of said upper end portion and said shank and to help clamp the insert to said platform.

7. The combination defined in claim 6 in which the upper end portion of said pin includes a cylindrical section located between said upper and lower frusto-conical sections.

8. The combination defined in claim 7 in which the diameter of said cylindrical section is equal to the major diameters of said frusto-conical sections and is just slightly less than the diameter of said opening.

9. The combination defined in claim 8 in which the axis of said opening intersects the axis of said hole at approximately the center of said cylindrical section.

10. The combination defined in claim 8 in which the cone angle of said lower frusto-conical section is approximately equal to the cone angle of said upper frusto-conical section and is approximately equal to said predetermined angle whereby the inner side of said lower frusto-conical section substantially parallels the inner wall of said opening and the outer side of said upper frusto-conical section substantially parallels the outer wall of said opening.

11. The combination defined in claim 6 in which the cone angle of said lower frusto-conical section is approximately equal to the cone angle of said upper frusto-conical section and is approximately equal to said predetermined angle whereby the inner side of said lower frusto-conical section substantially parallels the inner wall of said opening and the outer side of said upper frusto-conical section substantially parallels the outer wall of said opening.

12. The combination defined in claim 6 in which said pin includes a generally cylindrical neck smaller in diameter than said shank and smaller in diameter than the minor diameter of said lower frusto-conical section, said neck being located between said shank and said lower frusto-conical section.

13. The combination defined in claim 12 further including a shim sandwiched between said insert and said platform, said shim being formed with a bore for receiving said pin and having one wall engageable with the pin to prevent edgewise removal of the shim from the pin, a counterbore at the upper end of said bore, and a washer seated in said counterbore and formed with an opening whose edges embrace said neck and are engageable with the lower end of said lower frusto-conical section to restrict upward removal of said shim from the upper end portion of said pin when the latter is loosened and said insert is removed from said holder.

14. The combination as defined in claim 13 in which said washer is made of resiliently yieldable material, the opening in said washer having a relaxed diameter smaller than the major diameter of said lower frusto-conical section and being stretchable to permit insertion of the washer onto the pin.

15. The combination defined in claim 14, in which the opening in said washer is located eccentrically of the washer to accommodate said pin.

16. The combination defined in claim 13 in which the opening in said washer comprises a slot opening out of one edge of the washer, said slot having a width greater than the diameter of said neck and smaller than the major diameter of said lower frusto-conical section.

17. A locking pin for clamping a cutting insert to an insert holder, said pin comprising a threaded shank, a first frusto-conical section located near one end of said shank and tapering toward the shank, and a second frusto-conical section located near the larger end of said first section and tapering away from said shank.

18. A locking pin as defined in claim 17 in which the cone angles of said frusto-conical sections are approximately equal.

19. A locking pin as defined in claim 18 which includes a cylindrical section located between said frusto-conical sections.

20. A locking pin as defined in claim 19 in which the major diameter of said first frusto-conical section is equal to the diameter of said cylindrical section and to the major diameter of said second frusto-conical section.

21. A locking pin as defined in claim 20 further including a generally cylindrical neck smaller in diameter than said shank and the minor diameter of said first frusto-conical section, said neck being located between said shank and said first frusto-conical section.

* * * * *